US012790543B2

(12) United States Patent
Noguchi et al.

(10) Patent No.: US 12,790,543 B2
(45) Date of Patent: Nov. 10, 2026

(54) METHOD FOR PRODUCING CERAMIC SINTERED BODY

(71) Applicant: NICHIA CORPORATION, Anan (JP)

(72) Inventors: Teruhiko Noguchi, Anan (JP); Toshiyuki Hirai, Komatsushima (JP); Shimpei Kinoshita, Anan (JP)

(73) Assignee: NICHIA CORPORATION, Anan (JP)

( * ) Notice: Subject to any disclaimer, the term of this patent is extended or adjusted under 35 U.S.C. 154(b) by 103 days.

(21) Appl. No.: 18/785,467

(22) Filed: Jul. 26, 2024

(65) Prior Publication Data

US 2025/0034452 A1 Jan. 30, 2025

(30) Foreign Application Priority Data

Jul. 28, 2023 (JP) ................................ 2023-123298

(51) Int. Cl.
*C09K 11/77* (2006.01)
*C01B 21/06* (2006.01)

(52) U.S. Cl.
CPC .... *C09K 11/77347* (2021.01); *C01B 21/0602* (2013.01); *C01P 2002/54* (2013.01); *C01P 2006/60* (2013.01)

(58) Field of Classification Search
CPC . C01B 21/0602; C01B 21/06; C09K 11/0883; C09K 11/77347; C09K 11/00; C09K 11/77; C04B 35/64
See application file for complete search history.

(56) References Cited

U.S. PATENT DOCUMENTS 9,276,180 B2 3/2016 Ishida et al.
9,349,664 B2 5/2016 Ishida et al.
10,374,132 B2 8/2019 Kumano et al.
10,753,574 B2 8/2020 Asami et al.
11,230,666 B2 1/2022 Ooguri et al.
11,976,228 B2 5/2024 Ooguri et al.
(Continued)

FOREIGN PATENT DOCUMENTS

CN 1818012 A * 8/2006
JP S61256979 A 11/1986
(Continued)

*Primary Examiner* — Erin Snelting
*Assistant Examiner* — Steven S Lee
(74) *Attorney, Agent, or Firm* — Hunton Andrews Kurth LLP

(57) ABSTRACT

A method for producing a ceramic sintered body includes: preparing a molded body containing a nitride fluorescent material having the composition containing Si; N; at least one alkaline earth metal element $M^1$; and a metal element $M^2$ being at least one selected from the group consisting of Eu, Ce, Tb, and Mn, to obtain a composition as described in the disclosure; obtaining a first sintered body by performing primary calcination of the molded body; obtaining a second sintered body by performing secondary calcination of the first sintered body in contact with a solid composed of a molybdenum metal or an alloy containing molybdenum as a main component; and obtaining a third sintered body by performing third calcination of the second sintered body while being placed in a container containing a metal having a melting point higher than that of the molybdenum metal.

11 Claims, 9 Drawing Sheets

(56) References Cited

U.S. PATENT DOCUMENTS

| | | | | |
|---|---|---|---|---|
| 2004/0135504 | A1* | 7/2004 | Tamaki | C01B 21/0602 313/512 |
| 2010/0085728 | A1* | 4/2010 | Seto | C09K 11/0883 252/301.6 F |
| 2010/0193822 | A1* | 8/2010 | Inobe | H10H 20/819 257/E33.056 |
| 2014/0131753 | A1 | 5/2014 | Ishida et al. | |
| 2015/0340577 | A1 | 11/2015 | Ishida et al. | |
| 2016/0244664 | A1* | 8/2016 | Tücks | C09K 11/0883 |
| 2017/0186920 | A1 | 6/2017 | Kumano et al. | |
| 2017/0321866 | A1 | 11/2017 | Asami et al. | |
| 2018/0000016 | A1* | 1/2018 | Amiya | A01G 22/05 |
| 2018/0002600 | A1* | 1/2018 | Hosokawa | C09K 11/77347 |
| 2018/0334617 | A1* | 11/2018 | Suzuki | C09K 11/7792 |
| 2019/0330528 | A1* | 10/2019 | Morikawa | C09K 11/0883 |
| 2020/0172804 | A1* | 6/2020 | Ooguri | C01B 21/068 |
| 2020/0270519 | A1* | 8/2020 | Shinohara | C09K 11/0883 |
| 2021/0079298 | A1* | 3/2021 | Takeda | C09K 11/64 |
| 2021/0371975 | A1* | 12/2021 | Miyai | C23C 16/4417 |
| 2022/0106523 | A1 | 4/2022 | Ooguri et al. | |

FOREIGN PATENT DOCUMENTS

| | | | | | |
|---|---|---|---|---|---|
| JP | 2005001909 | A | * | 1/2005 | |
| JP | 2014112635 | A | | 6/2014 | |
| JP | 2017117912 | A | | 6/2017 | |
| JP | 2018150496 | A | * | 9/2018 | |
| JP | 2020083739 | A | | 6/2020 | |
| WO | WO-2005004246 | A1 | * | 1/2005 | C04B 35/593 |
| WO | 2016117623 | A1 | | 7/2016 | |
| WO | WO-2020211875 | A1 | * | 10/2020 | C09K 11/0883 |
| WO | WO-2021192681 | A1 | * | 9/2021 | H10H 20/8513 |
| WO | 2022163730 | A1 | | 8/2022 | |

* cited by examiner

Example 3: Second Sintered Body after Secondary Calcination

Example 3: Third Sintered Body after Third Calcination

Comparative Example 4: Second Sintered Body after Secondary Calcination

Comparative Example 4: Second Sintered Body after Grinding

METHOD FOR PRODUCING CERAMIC SINTERED BODY

CROSS-REFERENCE TO RELATED PATENT APPLICATION

This application claims priority to Japanese Patent Application No. 2023-123298, filed on Jul. 28, 2023, the disclosure of which is hereby incorporated by reference in its entirety.

BACKGROUND

Technical Field

There are light emitting devices using a light emitting element such as a light emitting diode (LED) or a laser diode (LD), which are constituted by combining a light emitting element serving as an excitation light source and a member containing a fluorescent material that absorbs a part of light emitted from the light emitting element and converts the wavelength to another one. The light emitting devices emit a mixed color light of light emitted from the light emitting element and light emitted from the fluorescent material. Such light emitting devices are used for applications such as on-vehicle lighting, general lighting, backlighting for liquid crystal display devices, illuminations, and light sources for projectors.

As a member containing a fluorescent material, International Unexamined Patent Publication No. 2016/117623 discloses a sintered body containing a fluoride inorganic binder and a nitride fluorescent material.

In the sintered body, the fluoride inorganic binder and the nitride fluorescent material react with each other during calcination, resulting in a decrease in luminous flux of the sintered body containing the nitride fluorescent material, which may adversely affect the light emitting characteristics.

SUMMARY

The present disclosure has an object to provide a method for producing a ceramic sintered body which can emit light having a high luminous flux.

According to a first aspect of the present disclosure, a method for producing a ceramic sintered body includes: preparing a molded body containing a nitride fluorescent material having a composition containing: Si; N; an alkaline earth metal element $M^1$ being at least one selected from the group consisting of Ba, Sr, Ca, and Mg; and a metal element $M^2$ being at least one selected from the group consisting of Eu, Ce, Tb, and Mn, to obtain a composition in which, relative to 1 mol of the composition, a total molar ratio of the alkaline earth metal element $M^1$ and the metal element $M^2$ is 2, a molar ratio of the metal element $M^2$ is a product of a parameter y and 2, the parameter y being 0.001 or more and less than 0.5, a molar ratio of Si is 5, and a molar ratio of N is 8; obtaining a first sintered body by performing primary calcination of the molded body; obtaining a second sintered body by performing secondary calcination of the first sintered body in contact with a solid composed of a molybdenum metal or an alloy containing molybdenum as a main component; and obtaining a third sintered body by performing third calcination of the second sintered body while being placed in a container containing a metal having a melting point higher than that of the molybdenum metal.

The present disclosure provides a method for producing a ceramic sintered body which can emit light having a high luminous flux.

DETAILED DESCRIPTION

Figure 1:
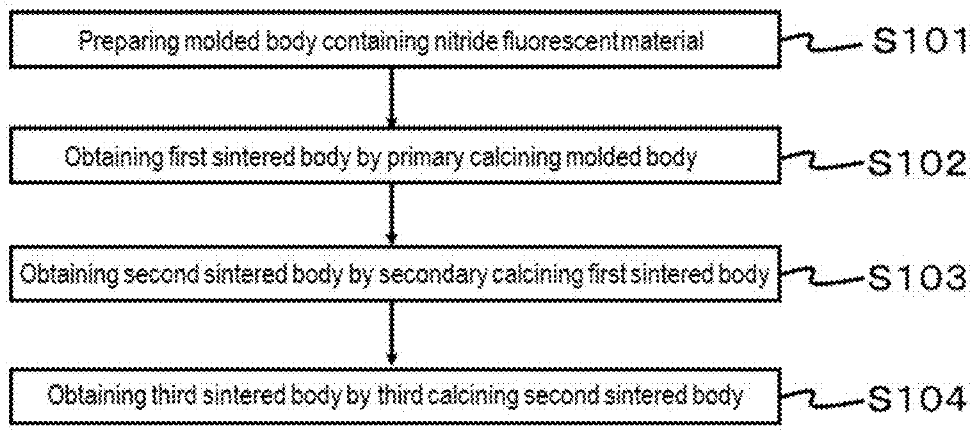
FIG. 1 is a flowchart describing an example of a method for producing a ceramic sintered body.

The following describes a method for producing a ceramic sintered body according to the present disclosure. Embodiments described below are intended to embody the technical idea of the present disclosure, and the present disclosure is not limited to the following method for producing a ceramic sintered body. The relationships between color names and chromaticity coordinates, and the relationships between wavelength ranges of light and color names of monochromatic lights in the present specification are in accordance with Japanese Industrial Standard (JIS) Z8110. In this specification, the "fluorescent material" is used in the same meaning as a "fluorescent phosphor".

The method for producing a ceramic sintered body includes: preparing a molded body containing a nitride fluorescent material having a composition containing: an alkaline earth metal element $M^1$ being at least one selected from the group consisting of Ba, Sr, Ca, and Mg; a metal element $M^2$ being at least one selected from the group consisting of Eu, Ce, Tb, and Mn; Si; and N, to obtain a composition in which, relative to 1 mol of the composition, a total molar ratio of the alkaline earth metal element $M^1$ and the metal element $M^2$ is 2, a molar ratio of the metal element $M^2$ is a product of a parameter y and 2, the parameter y being 0.001 or more and less than 0.5, a molar ratio of Si is 5, and a molar ratio of N is 8; obtaining a first sintered body by primary calcining the molded body; obtaining a second sintered body by secondary calcining the first sintered body in contact with a solid composed of a molybdenum metal or an alloy containing molybdenum as a main component; and obtaining a third sintered body by third calcining the second sintered body while being placed in a container containing a metal having a melting point higher than that of the molybdenum metal.

In the method for producing a ceramic sintered body, when a molded body containing a nitride fluorescent material is obtained and then calcined to form a sintered body, the sintered body, which contains crystals having a composition of the nitride fluorescent material. The sintered body, which may also contain crystals containing, for example, elements contained in the nitride fluorescent material as impurities, and having a composition different from that of the nitride fluorescent material. The crystals having a composition different from that of the nitride fluorescent material become impurities, and these impurities, if contained, may reduce a density of the resulting sintered body, or reduce a light emission intensity of light emitted by the nitride fluorescent material when the resulting sintered body is irradiated with light, resulting in a decrease in luminous flux.

For example, in the first sintered body obtained by primary calcining the molded body containing the nitride fluorescent material, the impurities such as the crystals having a composition different from that of the nitride fluorescent material are more easily generated inside the first sintered body than on the surface of the first sintered body.

In the method for producing a ceramic sintered body, when a molded body containing a nitride fluorescent material is primarily calcined to obtain a first sintered body, and then the resulting first sintered body is secondary calcined in contact with a solid composed of a molybdenum metal or an alloy containing molybdenum, a gas released by the decomposition of the crystals having a composition different from that of the nitride fluorescent material contained in the first sintered body is adsorbed on the molybdenum metal or the alloy containing molybdenum. By the secondary calcining, a gas released by the decomposition of the crystals having a composition different from that of the nitride fluorescent material generated inside the first sintered body is adsorbed on the solid composed of the molybdenum metal or the alloy containing molybdenum, and the decomposed gas is suppressed from returning to the sintered body, so that a second sintered body can be obtained in which the impurities such as the crystals having a composition different from that of the nitride fluorescent material are eliminated or reduced. This is considered to be because the impurities such as the crystals having a composition different from that of the nitride fluorescent material contained in the first sintered body are more easily reacted with the molybdenum metal or the alloy containing molybdenum as a main component in contact with the first sintered body, and are more easily released from the inside to the outside of the first sintered body than the crystals having a desired composition of the nitride fluorescent material.

The gas released by the decomposition of the crystals having a composition different from that of the nitride fluorescent material generated inside the first sintered body is adsorbed on the solid composed of the molybdenum metal or the alloy containing molybdenum as a main component in contact with the first sintered body, but the second sintered body in contact with the molybdenum metal or the alloy containing molybdenum as a main component may have portions of the body color on the surface of the second sintered body blackened or dulled by the decomposed gas.

By third calcining the second sintered body while being placed in a container containing a metal having a melting point higher than that of the molybdenum metal, the blackening and dullness remaining on the surface of the second sintered body are decomposed and released to the atmosphere as a gas, so that a third sintered body having a desired body color without blackening and dullness and having a high density can be obtained as a ceramic sintered body.

FIG. 1 shows a flowchart describing an example of steps of the method for producing a ceramic sintered body. An example of the method for producing a ceramic sintered body is described with reference to FIG. 1. The method for producing a ceramic sintered body includes preparing a molded body containing a nitride fluorescent material S101, obtaining a first sintered body by primary calcining the molded body S102, obtaining a second sintered body by secondary calcining the first sintered body S103, and obtaining a third sintered body by third calcining the second sintered body S104. The method for producing a ceramic sintered body may include processing a first sintered body to a desired thickness after obtaining a first sintered body and before obtaining a second sintered body, or may include processing a third sintered body to a desired thickness after obtaining a third sintered body. The method for producing a ceramic sintered body may include processing a second sintered body to a desired thickness after obtaining a second sintered body and before obtaining a third sintered body.

Figure 2:
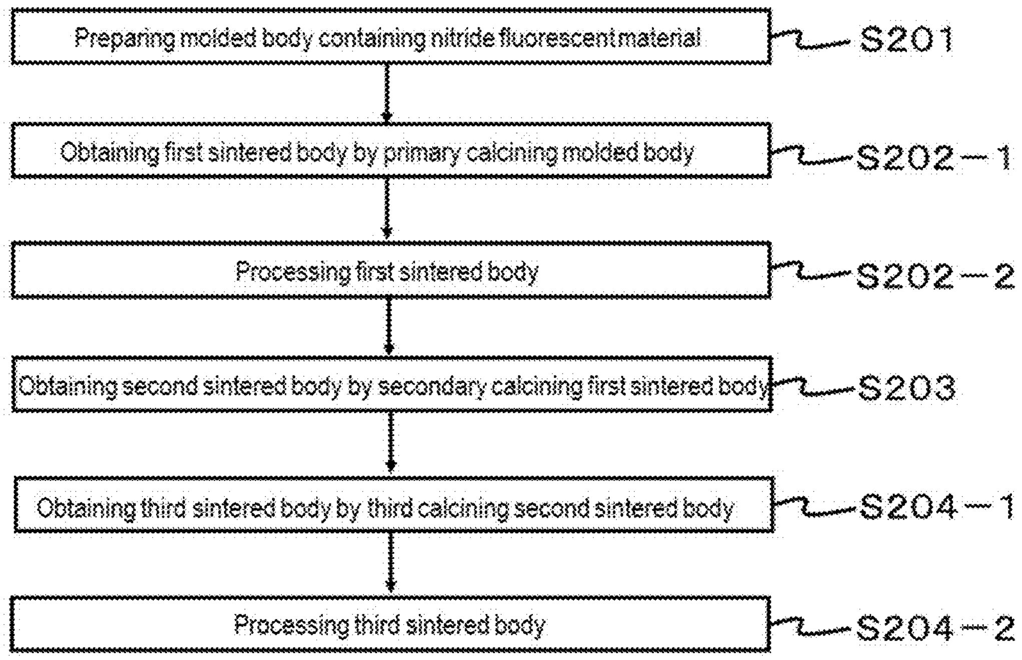
FIG. 2 is a flowchart describing an example of a method for producing a ceramic sintered body.

FIG. 2 shows a flowchart describing another example of steps of the method for producing a ceramic sintered body. The method for producing a ceramic sintered body may include processing a first sintered body S202-2 before obtaining a second sintered body S203. The method for producing a ceramic sintered body may include processing a third sintered body S204-2 after obtaining a third sintered body S204-1. The method for producing a ceramic sintered body includes providing a molded body containing a nitride fluorescent material S201, obtaining a first sintered body by primary calcining the molded body S202-1, obtaining a second sintered body by secondary calcining the first sintered body S203, and obtaining a third sintered body by third calcining the second sintered body S204-1, which are similar to the respective steps shown in FIG. 1.

The following describes each step of the method for producing a ceramic sintered body.

The method for producing a ceramic sintered body may include preparing a nitride fluorescent material before preparing a molded body. The nitride fluorescent material may be a commercially available product, or may be prepared by the following method.

The nitride fluorescent material is preferably prepared by obtaining a raw material mixture containing a first compound containing an alkaline earth metal element $M^1$ being at least one selected from the group consisting of Ba, Sr, Ca, and Mg, a second compound containing a metal element $M^2$ being at least one selected from the group consisting of Eu, Ce, Tb, and Mn, and a compound containing Si, and by subjecting the raw material mixture to heat treatment at a temperature of 980° C. or higher and 1,680° C. or lower in an atmosphere containing nitrogen. The nitride fluorescent material may be prepared with reference to Japanese Unexamined Patent Publication No. 2020-083739.

The nitride fluorescent material contains: an alkaline earth metal element $M^1$ being at least one selected from the group consisting of Ba, Sr, Ca, and Mg; a metal element $M^2$ being at least one selected from the group consisting of Eu, Ce, Tb, and Mn; Si; and N, to obtain a composition in which, relative to 1 mol of the composition, a total molar ratio of the alkaline earth metal element $M^1$ and the metal element $M^2$ is 2, a molar ratio of the metal element $M^2$ is a product of a parameter y and 2, the parameter y being 0.001 or more and less than 0.5, a molar ratio of Si is 5, and a molar ratio of N is 8.

The nitride fluorescent material preferably has a composition represented by the following formula (I):

$$(M^1_{1-y}M^2_y)_2Si_5N_8, \quad (I)$$

wherein $M^1$ represents an alkaline earth metal element being at least one selected from the group consisting of Ba, Sr, Ca, and Mg; $M^2$ represents a metal element being at least one selected from the group consisting of Eu, Ce, Tb, and Mn; and y satisfies $0.001 \leq y < 0.5$.

The nitride fluorescent material may have a composition represented by the following formula (II):

$$(Ba_{1-x-y}M^{12}_xM^2_y)_2Si_5N_8, \quad (II)$$

wherein $M^{12}$ represents an alkaline earth metal element being at least one selected from the group consisting of Sr, Ca, and Mg; $M^2$ represents a metal element being at least one selected from the group consisting of Eu, Ce, Tb, and Mn; and x and y satisfy $0 \leq x < 1.0$, $0.001 \leq y < 0.5$, and $0.001 \leq x + y < 1.0$.

The product of the parameter y and 2 represents a molar ratio of the metal element $M^2$ being at least one selected from the group consisting of Eu, Ce, Tb, and Mn, relative to 1 mol of the chemical composition of the nitride fluorescent material. The metal element $M^2$ is an activator for the nitride fluorescent material. The parameter y, from the viewpoint of obtaining a ceramic sintered body having a high light emission intensity, is preferably 0.0010 or more and less than 0.5 ($0.0010 \leq y < 0.5$), more preferably 0.0015 or more and 0.4 or less ($0.0015 \leq y \leq 0.4$), may be 0.0020 or more and 0.3 or less ($0.0020 \leq y \leq 0.3$), or may be 0.0025 or more and 0.2 or less ($0.0025 \leq y \leq 0.2$). The term "molar ratio" refers to a molar amount of an element contained in one mol of the chemical composition of the fluorescent material.

When the nitride fluorescent material contains Ba and an alkaline earth metal element $M^{12}$ being at least one selected from the group consisting of Sr, Ca, and Mg in the composition as shown in the formula (II), the product of the parameter x and 2 represents a molar ratio of the alkaline earth metal element $M^{12}$, relative to 1 mol of the composition of the nitride fluorescent material. The parameter x, depending on the amount of the activator, is preferably 0 or more and 0.75 or less ($0 \leq x < 0.75$), more preferably 0.01 or more and 0.6 or less ($0.01 \leq x \leq 0.60$), even more preferably 0.05 or more and 0.5 or less ($0.05 \leq x \leq 0.50$), or may be 0.06 or more and 0.45 or less ($0.06 \leq x \leq 0.45$).

The nitride fluorescent material preferably has an average particle diameter (Fisher Sub-Sieve Sizer's number) of less than 5.0 μm, as measured according to a Fisher Sub-Sieve Sizer (FSSS) method. When the average particle diameter of the nitride fluorescent material measured according to the FSSS method is less than 5.0 μm, it is possible to form a molded body with few voids. The average particle diameter of the nitride fluorescent material measured according to the FSSS method is more preferably 4.5 μm or less, even more preferably 4.0 μm or less, and may be 0.1 μm or more, or may be 0.5 μm or more. The FSSS method is a type of an air permeability method and is a method for measuring a specific surface area by utilizing the flow resistance of air to determine a particle diameter.

In preparing a molded body, raw materials forming a molded body contain a nitride fluorescent material. The raw materials forming a molded body preferably composed of a nitride fluorescent material. The content of the nitride fluorescent material in the raw material forming a molded body is preferably 100% by mass, may be 95% by mass or more, may be 97% by mass or more, may be 98% by mass or more, may be 99% by mass or more, or may be 99.5% by mass or more. The raw materials forming a molded body or the raw material mixture may contain, in addition to the nitride fluorescent material, a hydride, a nitride, a carbonate, a chloride, an imide compound, and an amide compound containing an element contained in the nitride fluorescent material. The raw materials forming a molded body or the raw material mixture preferably does not contain fluoride or oxide.

In preparing a molded body, the nitride fluorescent material or the raw material mixture containing the nitride fluorescent material is molded into a desired shape to obtain a molded body. The nitride fluorescent material or the raw material mixture containing the nitride fluorescent material is preferably in the form of a powder, or may be in the form of a slurry containing a powder. The molding method of the molded body employed may be a press molding method in which a powder is molded by pressing, or a slurry molding method in which a slurry containing a powder is prepared, and a molded body is obtained from the slurry. Examples of the press molding method include a die press molding method and a cold isostatic pressing (CIP) method specified in No. 2109 of JIS Z2500:2000. To form the shape of the molded body, two kinds of molding methods may be employed, and CIP molding may be performed after die press molding. In CIP molding, the molded body is preferably pressed using water as a medium.

The pressure in die press molding is preferably 1 MPa or more and 50 MPa or less, more preferably 2 MPa or more and 20 MPa or less, and even more preferably 2 MPa or more and 15 MPa or less. When the pressure in die press molding falls within the above range, the molded body can be formed into a desired shape.

The pressure in CIP molding is preferably 50 MPa or more and 500 MPa or less, more preferably 100 MPa or more and 450 MPa or less, and even more preferably 200 MPa or more and 400 MPa or less. When the pressure in CIP molding falls within the above range, the density of the molded body can be increased to obtain a molded body having a substantially uniform density throughout, and the density of the resulting sintered body can be increased in the subsequent calcination steps.

In obtaining a first sintered body by primary calcining the molded body, the temperature of the primary calcination is preferably 1,600° C. or higher and 2,200° C. or lower, more preferably 1,600° C. or higher and 2,000° C. or lower, even more preferably 1,600° C. or higher and 1,900° C. or lower, and still more preferably 1,600° C. or higher and 1,800° C. or lower. When the temperature of the primary calcination is 1,600° C. or higher and 2,200° C. or lower, it is possible to obtain a first sintered body having few voids. In the present specification, the case where an uncalcined molded body is calcined is referred to as primary calcination.

Examples of the primary calcination method include an atmosphere sintering method in which the calcination is performed in a non-oxidizing atmosphere without applying pressure or load, an atmosphere pressure sintering method in which the calcination is performed under pressure in a non-oxidizing atmosphere, a hot press sintering method, and a spark plasma sintering (SPS) method.

The primary calcination is preferably performed in an atmosphere containing a nitrogen gas. The secondary and third calcinations described below are also preferably performed in an atmosphere containing a nitrogen gas. The atmosphere containing a nitrogen gas in the primary, secondary, and third calcinations is preferably an atmosphere containing at least 99% by volume or more of nitrogen. The nitrogen content in the atmosphere containing a nitrogen gas is preferably 99% by volume or more, more preferably 99.5% by volume or more. The atmosphere containing a nitrogen gas may contain, in addition to nitrogen, a trace amount of gas such as oxygen, and the content of oxygen in the atmosphere containing a nitrogen gas is preferably 1% by volume or less, more preferably 0.5% by volume or less, even more preferably 0.1% by volume or less, still more preferably 0.01% by volume or less, and particularly preferably 0.001% by volume or less. The atmosphere in the calcination step may be an atmosphere containing reducing nitrogen, or may be an atmosphere containing a hydrogen gas and nitrogen. When a hydrogen gas is contained in the atmosphere containing nitrogen in the calcination step, the content of the hydrogen gas in the atmosphere is preferably 1% by volume or more, more preferably 5% by volume or more, and even more preferably 10% by volume or more. The atmosphere for the heat treatment may be a reducing atmosphere using a solid carbon in an air atmosphere.

In obtaining a first sintered body, calcining the molded body in an atmosphere containing a nitrogen gas allows for obtaining a first sintered body having a high relative density and containing crystals having a composition of a nitride fluorescent material having a high light emission intensity. In this case, when the metal element $M^2$, which is an activator for the nitride fluorescent material, is Eu, the ratio of divalent $Eu^{2+}$ contributing to light emission in the nitride fluorescent material increases, so that a first sintered body having a high light emission intensity can be obtained. Divalent $Eu^{2+}$ is easily oxidized to trivalent $Eu^{3+}$. However, by primary calcining the molded body in an atmosphere containing a highly reducing nitrogen gas, trivalent $Eu^{3+}$ in the nitride fluorescent material contained in the molded body is reduced to divalent $Eu^{2+}$, and the ratio of divalent $Eu^{2+}$ in the nitride fluorescent material increases, so that a first sintered body containing crystals having a composition of a nitride fluorescent material having a high light emission intensity can be obtained.

The atmospheric pressure in the primary calcination is preferably 0.1 MPa or more and 2.0 MPa or less, more preferably 0.2 MPa or more and 1.5 MPa or less, and even more preferably 0.5 MPa or more and 1.2 MPa or less. The atmospheric pressure in the primary calcination is preferably a gauge pressure. When the atmospheric pressure in the primary calcination falls within the above range, the decomposition of the crystal structure is suppressed, and a first sintered body containing a nitride fluorescent material having a high light emission intensity can be obtained.

The time for the primary calcination may be appropriately selected depending on the atmospheric pressure. The time for the calcination is, for example, 0.5 hour or more and 20 hours or less, preferably 1 hour or more and 10 hours or less.

The method for producing a sintered body may include processing a first sintered body after obtaining a first sintered body and before obtaining a second sintered body. Processing the first sintered body may facilitate decomposition of crystals having a composition different from that of the nitride fluorescent material contained inside the first sintered body and their release as a gas during the secondary calcination of the first sintered body. In the method for producing a sintered body, processing the first sintered body includes cutting the resulting first sintered body into a desired size. Examples of the cutting method include known methods such as methods using wire saws. The first sintered body is preferably processed so as to have a thickness of 200 μm or more and 1,500 μm or less, as described below.

The method for producing a ceramic sintered body includes obtaining a second sintered body by secondary calcining the first sintered body in contact with a solid composed of a molybdenum metal or an alloy containing molybdenum as a main component. The first sintered body is secondary calcined in contact with a solid composed of a molybdenum metal or an alloy containing molybdenum as a main component to decompose impurities such as crystals having a composition different from that of the nitride fluorescent material contained inside the first sintered body as a gas, and the decomposed gas is adsorbed on the molybdenum metal or the alloy containing molybdenum as a main component in contact with the first sintered body, so that a second sintered body having reduced impurities can be obtained. By performing the secondary calcination, impurities such as crystals having a composition different from that of the nitride fluorescent material contained inside the first sintered body are decomposed as a gas and adsorbed on a solid composed of a molybdenum metal or an alloy containing molybdenum as a main component. When all the decomposed gas is released to the outside, a second sintered body having a body color in which no blackening or dullness can be observed can be obtained. By performing the secondary calcination, part of the gas released by the decomposition of impurities such as crystals having a composition different from that of the nitride fluorescent material contained inside the first sintered body may remain as a blackening or dullness on a part of the surface of the second sintered body. By performing the secondary calcination, part of the gas released by the decomposition of impurities such as crystals having a composition different from that of the nitride fluorescent material contained inside the first sintered body may also remain as a blackening or dullness on a part of the surface of the second sintered body due to the reaction with the molybdenum metal or the alloy containing molybdenum as a main component. In the present specification, the case where a first sintered body obtained by calcining a molded body is secondary calcined in contact with a molybdenum metal or an alloy containing molybdenum as a main component is referred to as secondary calcination.

In obtaining a second sintered body, the temperature of the secondary calcination is preferably 1,650° C. or higher and 1,800° C. or lower, more preferably 1,660° C. or higher and 1,780° C. or lower, even more preferably 1,670° C. or higher and 1,750° C. or lower, and still more preferably 1,675° C. or higher and 1,725° C. or lower. When the temperature of the secondary calcination is 1,650° C. or higher and 1,800° C. or lower, impurities such as crystals having a composition different from that of the nitride fluorescent material generated inside the first sintered body are decomposed and released as a gas while suppressing the decomposition of the crystal structure having a composition of the nitride fluorescent material contained in the first sintered body, so that the released gas can be adsorbed on the molybdenum metal or the alloy containing molybdenum as a main component in contact with the first sintered body. The temperature of the secondary calcination is preferably lower than that of the third calcination described below.

The secondary calcination is preferably performed in an atmosphere containing a nitrogen gas. The secondary calcination atmosphere may be the same as or different from the primary calcination atmosphere. The atmosphere containing a nitrogen gas in the secondary calcination refers to the same as the atmosphere containing a nitrogen gas in the primary calcination. Secondary calcining the first sintered body in an atmosphere containing a nitrogen gas suppresses oxidation of divalent $Eu^{2+}$ in the crystals having a composition of the nitride fluorescent material contained in the first sintered body to trivalent $Eu^{3+}$, and the ratio of divalent $Eu^{2+}$ in the crystals having a composition of the nitride fluorescent material increases, so that a second sintered body can be obtained while maintaining the light emission intensity.

The secondary calcination is preferably performed at a gauge pressure of 0.2 MPa or more and 2.0 MPa or less. The secondary calcination performed at a gauge pressure of 0.2 MPa or more and 2.0 MPa or less facilitates decomposition of impurities such as crystals having a composition different from that of the nitride fluorescent material generated inside the first sintered body and their release as a gas. The secondary calcination may be performed at a gauge pressure of 0.3 MPa or more and 1.5 MPa or less, may be performed at a gauge pressure of 0.4 MPa or more and 1.2 MPa or less, or may be performed at a gauge pressure of 0.5 MPa or more and 1.0 MPa or less.

In obtaining a second sintered body, the time for the secondary calcination is preferably 1 hour or more and 3 hours or less. The secondary calcination time of 1 hour or more and 3 hours or less facilitates decomposition of impurities such as crystals having a composition different from that of the nitride fluorescent material generated inside the first sintered body and their release as a gas, while suppressing the decomposition of the crystal structure having a composition of the nitride fluorescent material contained in the first sintered body. The secondary calcination time may be 1 hour or more and 2 hours or less.

In obtaining a second sintered body, the first sintered body is a plate-shaped body, and a thickness of the first sintered body is preferably 200 μm or more and 1,500 μm or less. In obtaining a second sintered body, even if the first sintered body contains crystals having a composition different from that of the nitride fluorescent material therein, the thickness of the first sintered body of 200 μm or more and 1,500 μm or less facilitates decomposition of the crystals by the secondary calcination and their release as a gas to the outside of the first sintered body or to the surface of the first sintered body near the outside of the first sintered body. When the first sintered body is a plate-shaped body, the shape of the plate-shaped body may be rectangular or circular in a plan view. The crystals having a composition different from that of the nitride fluorescent material are easily formed inside the first sintered body. Therefore, by processing the first sintered body to have a thickness of 200 μm or more and 1,500 μm or less, the gas generated by the decomposition of the crystals having a composition different from that of the nitride fluorescent material formed inside the first sintered body by the secondary calcination is easily released to the outside, so that the impurities contained in the resulting second sintered body can be further reduced.

In obtaining a second sintered body, a solid composed of a molybdenum metal or an alloy containing molybdenum as a main component is preferably brought into contact with a principal surface of the first sintered body. By contacting a solid containing a molybdenum metal or molybdenum as a main component with a principal surface of the first sintered body, the gas released by the decomposition of the crystals having a composition different from that of the nitride fluorescent material contained in the first sintered body is easily adsorbed by the secondary calcination. The principal surface of the first sintered body refers to a surface having the largest area among the surfaces constituting the sintered body. When the first sintered body is a plate-shaped body, it may have two opposing principal surfaces.

In obtaining a second sintered body, the solid composed of a molybdenum metal or an alloy containing molybdenum as a main component may be in the form of a plate, a granule, or a powder. In obtaining a second sintered body, the solid composed of a molybdenum metal or an alloy containing molybdenum as a main component may be in the form of a container in which the first or second sintered body can be placed. The solid composed of a molybdenum metal or an alloy containing molybdenum as a main component is preferably in the form of a container or a plate from the viewpoint of easy contact with the first sintered body and easy handling. Examples of the solid composed of a molybdenum metal or an alloy containing molybdenum as a main component include, when in the form of a container, crucibles and boats composed of a molybdenum metal or an alloy containing molybdenum as a main component. The solid composed of a molybdenum metal or an alloy containing molybdenum as a main component, when in the form of a container, may be placed in contact with the principal surface of the first sintered body on the placement surface of the container. In obtaining a second sintered body, if the secondary calcination is performed in a furnace, the opening of the container in which the first sintered body is placed may be closed with a lid or exposed without being closed with a lid.

In obtaining a second sintered body, the first sintered body is a plate-shaped body, and the first sintered body is preferably sandwiched between two solids composed of a molybdenum metal or an alloy containing molybdenum as a main component and brought into contact with each other. When the first sintered body is a plate-shaped body, it is preferable to sandwich the first sintered body between two molybdenum metals or alloys containing molybdenum as a main component and to bring them into contact such that the solids composed of a molybdenum metal or an alloy containing molybdenum as a main component are each in contact with both of the two opposing principal surfaces of the first sintered body. When the first sintered body is a plate-shaped body and has two opposing principal surfaces, by sandwiching the first sintered body between two molybdenum metals or alloys containing molybdenum as a main component so as to bring the solids into contact with the two opposing principal surfaces of the first sintered body, the gas released by the decomposition of impurities contained in the first sintered body by the secondary calcination is easily adsorbed on the molybdenum metals or alloys containing molybdenum as a main component, so that impurities contained in the second sintered body can be reduced. The two solids composed of a molybdenum metal or an alloy containing molybdenum as a main component, which are brought into contact with the first sintered body sandwiched therebetween, may be two plate-shaped bodies, or one of which may be a container such as a crucible in which the first sintered body can be placed, and the other of which may be a plate-shaped body.

In obtaining a second sintered body, the solid composed of a molybdenum metal or an alloy containing molybdenum as a main component, which is brought into contact with the first sintered body, preferably has an area equal to or larger than the area of the portion of the first sintered body to be in contact. The alloy containing molybdenum as a main component refers to an alloy having the highest molybdenum content among the components contained in the alloy. The molybdenum content in the alloy containing molybdenum as a main component is preferably 50% by mass or more, more preferably 60% by mass or more, even more preferably 70% by mass or more, still more preferably 80% by mass or more, and particularly preferably 90% by mass or more, relative to the total amount of the alloy. The alloy containing molybdenum as a main component may contain at least one element selected from the group consisting of titanium, zirconium, hafnium, niobium, tantalum, tungsten, rhenium, lanthanum, and yttrium.

In the present specification, a hot isostatic pressing (HIP) treatment is not performed in the secondary calcination. The secondary calcination excludes a hot isostatic pressing (HIP) treatment. The hot isostatic pressing (HIP) treatment may refer to a heat treatment performed at a high pressure of, for example, 10 MPa or more, preferably 50 MPa or more and 400 MPa or less. The HIP treatment may refer to a hot isostatic pressing (HIP) treatment as specified in JIS Z2500: 2000, No. 2112.

The method for producing a ceramic sintered body includes obtaining a third sintered body by third calcining the second sintered body while being placed in a container containing a metal having a melting point higher than that of a molybdenum metal. By secondary calcining the second sintered body, part of the gas released by the decomposition of impurities such as crystals having a composition different from that of the nitride fluorescent material contained inside the first sintered body, or a reaction product formed by the reaction of the gas with the molybdenum metal may remain as a blackening or dullness on the surface of the second sintered body. Even when the blackening or dullness is present on the surface, the blackening or dullness can be removed by third calcining the second sintered body while being placed in a container containing a metal having a melting point higher than that of the molybdenum metal, and a third sintered body having a desired body color can be obtained. Even when no blackening or dullness is present on the surface of the second sintered body, a third sintered body having a high relative density can be obtained by third calcining the second sintered body while being placed in a container containing a metal having a melting point higher than that of the molybdenum metal. From the fact that the relative density of the third sintered body increases, the following can be considered: Even if the presence of blackening or dullness on the surface of the second sintered body cannot be visually confirmed, the gas released by the decomposition of crystals having a composition different from that of the nitride fluorescent material remaining in the second sintered body, or a reaction product formed by the reaction of the decomposed gas with the molybdenum metal are released to the outside as a gas or the like by the third calcination, thereby obtaining a third sintered body having a high relative density.

In obtaining a third sintered body, the temperature of the third calcination is preferably 1,650° C. or higher and 1,850° C. or lower, more preferably 1,660° C. or higher and 1,840° C. or lower, even more preferably 1,670° C. or higher and 1,820° C. or lower, and still more preferably 1,675° C. or higher and 1,800° C. or lower. When the temperature of the third calcination is 1,650° C. or higher and 1,850° C. or lower, impurities remaining in the second sintered body are released to the outside as a gas while suppressing the decomposition of crystals having a composition of the nitride fluorescent material contained in the second sintered body, so that a third sintered body having a desired body color and a high relative density can be obtained. The impurities remaining in the second sintered body may be part of the gas released by the decomposition of crystals having a composition different from that of the nitride fluorescent material, or a reaction product formed by the reaction of the decomposed gas with molybdenum.

The temperature of the third calcination is preferably higher than that of the secondary calcination. When the temperature of the third calcination is higher than that of the secondary calcination, the impurities remaining in the second sintered body are easily released as a gas. As for the temperature difference between the secondary calcination and the third calcination, the temperature of the third calcination is preferably 10° C. or more higher than that of the secondary calcination, more preferably 20° C. or more, even more preferably 30° C. or more, still more preferably 40° C. or more, and particularly preferably 50° C. or more; and the temperature of the secondary calcination may be 150° C. or less lower than that of the third calcination, may be 125° C. or less, or may be 100° C. or less.

The third calcination is preferably performed in an atmosphere containing a nitrogen gas. The third calcination atmosphere may be the same as or different from the primary or secondary calcination atmosphere. The atmosphere containing a nitrogen gas in the third calcination refers to the same as the atmosphere containing a nitrogen gas in the primary or secondary calcination. Third calcining the second sintered body in an atmosphere containing a nitrogen gas suppresses oxidation of divalent $Eu^{2+}$ in the crystals having a composition of the nitride fluorescent material contained in the second sintered body to trivalent $Eu^{3+}$, and the ratio of divalent $Eu^{2+}$ in the crystals having a composition of the nitride fluorescent material increases, so that a third sintered body having a high relative density can be obtained while maintaining the light emission intensity.

The third calcination is preferably performed at a gauge pressure of 0.2 MPa or more and 2.0 MPa or less. The third calcination performed at a gauge pressure of 0.2 MPa or more and 2.0 MPa or less facilitates decomposition of the impurities remaining in the second sintered body and their release as a gas. The third calcination may be performed at a gauge pressure of 0.3 MPa or more and 1.5 MPa or less, may be performed at a gauge pressure of 0.4 MPa or more and 1.2 MPa or less, or may be performed at a gauge pressure of 0.5 MPa or more and 1.0 MPa or less. The pressure in the third calcination may be the same as or different from the pressure in the primary or secondary calcination.

In obtaining a third sintered body, the time for the third calcination is preferably 1 hour or more and 5 hours or less. The third calcination time of 1 hour or more and 5 hours or less facilitates decomposition of the impurities remaining in the second sintered body and their release as a gas, while suppressing the decomposition of the crystal structure having a composition of the nitride fluorescent material contained in the second sintered body. The third calcination time may be 1 hour or more and 4 hours or less, may be 1 hour or more and 3 hours or less, or may be 1 hour or more and 2 hours or less.

In obtaining a third sintered body, the metal having a melting point higher than that of a molybdenum metal is preferably at least one selected from the group consisting of tungsten, tantalum, and rhenium. The container containing a metal having a melting point higher than that of a molybdenum metal preferably contains a metal having a melting point higher than that of a molybdenum metal as a main component. The container that contains a metal having a melting point higher than that of a molybdenum metal as a main component means that the container has the highest content of a metal having a melting point higher than that of a molybdenum metal. The content of the metal having a melting point higher than that of a molybdenum metal is preferably 50% by mass or more, more preferably 60% by mass or more, even more preferably 70% by mass or more, still more preferably 80% by mass or more, and particularly preferably 90% by mass or more, relative to the total amount of the container. Examples of the container containing a metal having a melting point higher than that of a molybdenum metal include crucibles and boats. In obtaining a third sintered body, if the third calcination is performed in a furnace, the opening of the container in which the second sintered body is placed may be closed with a lid or exposed without being closed with a lid.

In obtaining a third sintered body, it is preferred that the second sintered body is placed in the container containing a metal having a melting point higher than that of a molybdenum metal without contacting a solid composed of a molybdenum metal or an alloy containing molybdenum, and then third calcined to obtain a third sintered body. When the second sintered body is third calcined in contact with a solid composed of a molybdenum metal or an alloy containing molybdenum, a third sintered body having a desired body color cannot be obtained due to the reaction between the impurities remaining in the second sintered body and the molybdenum metal or alloy containing molybdenum, and blackening and dullness may remain on the surface of the third sintered body.

The third sintered body preferably has a relative density of 95% or more, more preferably 96% or more, even more preferably 97% or more, still more preferably 98% or more, and particularly preferably 99% or more. When the relative density of the third sintered body is high, the third sintered body has reduced light scattering due to impurities and voids, and can emit fluorescence having a high luminous flux upon irradiation with light. With the third sintered body having a high relative density, even when processing such as cutting is performed after obtaining the third sintered body, no cracking or chipping may occur, and when a ceramic sintered body composed of the third sintered body is used in a light emitting device, the occurrence of color unevenness can be suppressed. The relative density of the third sintered body may be 100%, or may be 99.9% or less.

The relative density of the sintered body refers to a value calculated by an apparent density of the sintered body relative to a true density of the sintered body. The relative density of the sintered body can be calculated according to the following calculation formula (1). The sintered body shown in the following calculation formulas (1) and (2) includes a third sintered body.

$$\text{Relative density (\%) of sintered body} = \frac{\text{Apparent density of sintered body}}{\text{True density of sintered body}} \times 100 \tag{1}$$

The true density of the sintered body refers to a value obtained by multiplying a mass ratio (% by mass) of the nitride fluorescent material by a true density of the nitride fluorescent material relative to 100% by mass of the sintered body. When the sintered body is formed from a molded body composed only of the nitride fluorescent material, the true density of the nitride fluorescent material is the true density of the sintered body.

The apparent density of the sintered body refers to a value obtained by dividing a mass of the sintered body by a volume of the sintered body determined by the Archimedes' method, and is calculated by the following formula (2). In the following formula (2), the volume of the sintered body refers to a volume determined by the Archimedes' method.

$$\text{Apparent density } (g/cm^3) \text{ of sintered body} = \frac{\text{Mass (g) of sintered body}}{\text{Volume } (cm^3) \text{ of sintered body}} \tag{2}$$

The third sintered body contains: an alkaline earth metal element $M^1$ being at least one selected from the group consisting of Ba, Sr, Ca, and Mg; a metal element $M^2$ being at least one selected from the group consisting of Eu, Ce, Tb, and Mn; Si; and N in the composition. Preferably, the third sintered body contains crystals having a composition of a nitride fluorescent material, the nitride fluorescent material having a composition in which, relative to 1 mol of the composition, a total molar ratio of the alkaline earth metal element $M^1$ and the metal element $M^2$ is 2, a molar ratio of the metal element $M^2$ is a product of a parameter y and 2, the parameter y being 0.001 or more and less than 0.5, a molar ratio of Si is 5, and a molar ratio of N is 8. More preferably, the third sintered body is composed only of crystals having a composition of the above-mentioned nitride fluorescent material. It is preferred that the crystals having a composition of the nitride fluorescent material contained in the third sintered body has a composition represented by the formula (I). It is more preferred that the crystals having a composition of the nitride fluorescent material contained in the third sintered body has a composition represented by the formula (II).

The method for producing a ceramic sintered body may include processing the resulting third sintered body. Examples of processing the third sintered body include cutting the resulting third sintered body into a desired size, or grinding or polishing the third sintered body. Examples of the cutting, grinding, and polishing methods include known methods such as those using surface grinders, blade dicing, laser dicing, and wire saws. Among these processes, grinding or polishing is preferred from the viewpoint of flattening the processed surface with high precision. By processing the third sintered body, a ceramic sintered body having a desired thickness and size can be obtained. The thickness of the ceramic sintered body to be used as a wavelength conversion member is not particularly limited, but in consideration of mechanical strength and wavelength conversion efficiency, it is preferably 1 μm or more and 1 mm or less, more preferably 10 μm or more and 800 μm or less, even more preferably 50 μm or more and 500 μm or less, still more preferably 95 μm or more and 450 μm or less, may be 99 μm or more and 400 μm or less, may be 100 μm or more and 400 μm or less, may be 120 μm or more and 300 μm or less, or may be 150 μm or more and 250 μm or less.

The resulting third sintered body can be a ceramic sintered body to be used as a wavelength conversion member. The ceramic sintered body to be used as a wavelength conversion member is irradiated with light having a light emission peak wavelength of, for example, 380 nm or more and 570 nm or less to convert the wavelength of the irradiated light, and preferably emits light having a color in an area A in the xy chromaticity coordinates of the CIE 1931 chromaticity diagram, wherein when the chromaticity coordinates (x, y) are (x=0.549, y=0.425) as a first A point, (x=0.562, y=0.438) as a second A point, (x=0.589, y=0.411) as a third A point, and (x=0.576, y=0.407) as a fourth A point, the area A is defined by being surrounded by a first A straight line connecting the first A point and the second A point, a second A straight line connecting the second A point and the third A point, a third A straight line connecting the third A point and the fourth A point, and a fourth A straight line connecting the fourth A point and the first A point.

Figure 3:
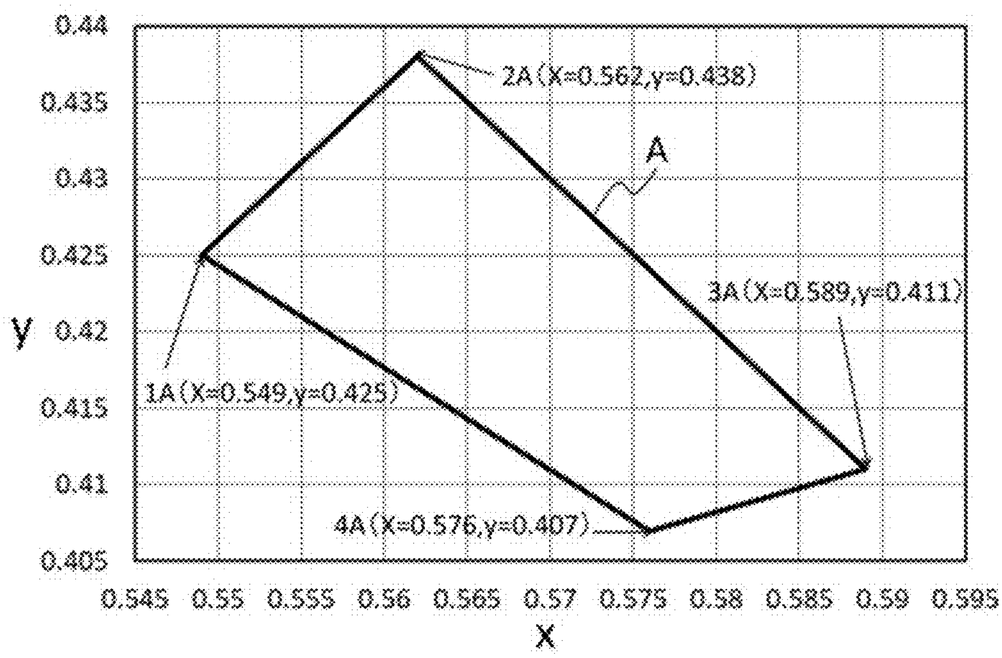
FIG. 3 is a diagram showing an area A in the xy chromaticity coordinates of the CIE 1931 chromaticity diagram.

FIG. 3 is a diagram showing an area A in the xy chromaticity coordinates of the CIE 1931 chromaticity diagram. Light that emits a color within the area A in the chromaticity diagram exhibits an orange light emission color.

The ceramic sintered body obtained by the above-mentioned production method can be combined with a light emitting element such as an LED or LD to constitute a light emitting device. The light emitting device converts excitation light emitted from the light emitting element by the ceramic sintered body, and emits light having a desired light emission peak wavelength. The light emitting device emits mixed color light of the light emitted from the light emitting element and the light wavelength-converted by the ceramic sintered body. The light emitting device may be used in combination with the ceramic sintered body containing the nitride fluorescent material and another ceramic sintered body containing a fluorescent material other than the nitride fluorescent material.

The light emitting element preferably has a light emission peak wavelength of 365 nm or more and 650 nm or less, more preferably 380 nm or more and 570 nm or less, and even more preferably 400 nm or more and 550 nm or less. For example, the light emitting element is preferably a semiconductor light emitting element using a nitride-based semiconductor ($In_XAl_YGa_{1-X-Y}N$, $0\leq X$, $0\leq Y$, $X+Y\leq 1$). By using a semiconductor light emitting element as the excitation light source, a stable light emitting device having high efficiency, high output linearity with respect to the input, and high resistance to mechanical shock can be obtained.

Figure 4A:
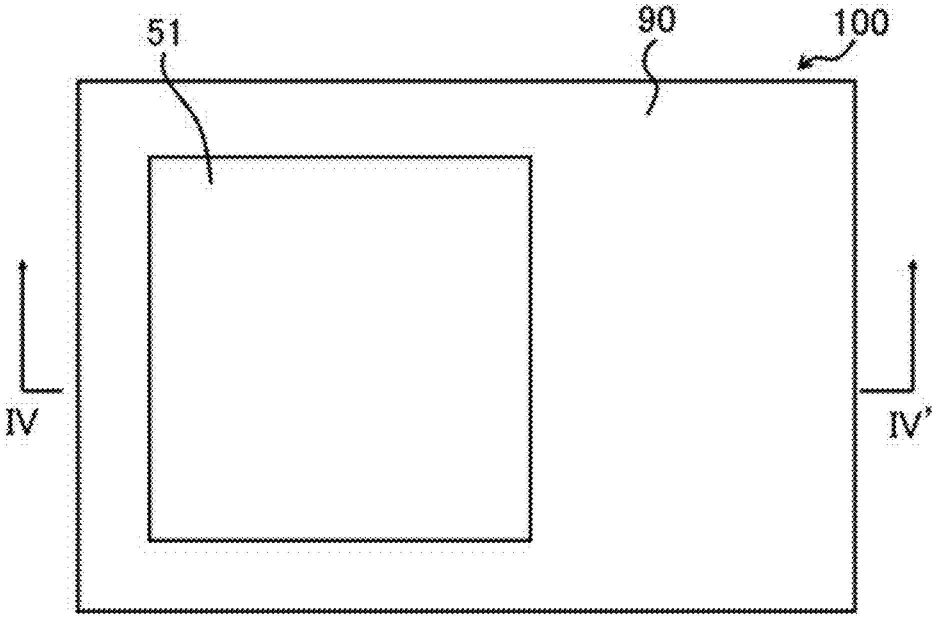
FIG. 4A is a schematic plan view showing an example of a light emitting device using a ceramic sintered body as a wavelength conversion member.
Figure 4B:
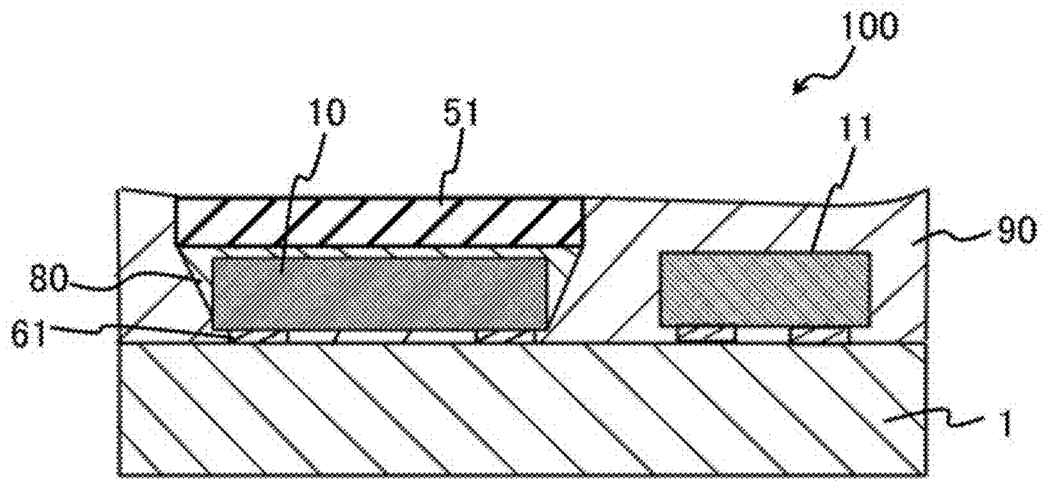
FIG. 4B is a schematic cross-sectional view showing an example of a light emitting device using a ceramic sintered body as a wavelength conversion member.

FIGS. 4A and 4B show a configuration of an exemplary light emitting device using the ceramic sintered body as a wavelength conversion member. FIG. 4A is a schematic plan view of a light emitting device 100. FIG. 4B is a schematic cross-sectional view of the IV-IV' line of the light emitting device 100 shown in FIG. 4A. The light emitting device 100 includes a light emitting element 10 having a light emission peak wavelength of 365 nm or more and 650 nm or less, and a wavelength conversion member 51 that emits light upon excitation with light emitted from the light emitting element 10. The light emitting element 10 is flip-chip mounted on a substrate 1 via a bump that is a conductive member 61. The wavelength conversion member 51 is disposed on the light emitting surface of the light emitting element 10 via an adhesive layer 80. The side surfaces of the light emitting element 10 and the wavelength conversion member 51 are covered with a covering member 90 that reflects light. The light emitting element 10 receives electric power from the outside of the light emitting device 100 via a wiring and the conductive member 61 formed on the substrate 1, thereby allowing the light emitting device 100 to emit light. The light emitting device 100 may include a semiconductor element 11, such as a protective element, for preventing the light emitting element 10 from being destroyed due to excessive voltage application. The semiconductor element 11 may be mounted on the substrate 1 via the conductive member 61. The covering member 90 is disposed to cover, for example, the semiconductor element 11. The following describes the members used in the light emitting device. For the details, for example, the disclosure of Japanese Unexamined Patent Publication No. 2014-112635 may be referred to.

The adhesive layer is preferably made of a material that can optically connect the light emitting element and the wavelength conversion member. The material constituting the adhesive layer is preferably at least one resin selected from the group consisting of an epoxy resin, a silicone resin, a phenol resin, and a polyimide resin. The light emitting element and the wavelength conversion member may be directly bonded without an adhesive layer.

Examples of the semiconductor element optionally disposed in the light emitting device include a transistor for controlling the light emitting element and a protective element for suppressing the destruction and the performance deterioration of the light emitting element due to excessive voltage application. Examples of the protective element include a Zener diode. When the light emitting device includes a covering member, it is preferable to use an insulating material as the material of the covering member. More specific examples thereof include a phenol resin, an epoxy resin, a bismaleimide triazine resin (BT resin), a polyphthalamide (PPA) resin, and a silicone resin. A colorant, a fluorescent material, and a filler may be optionally added to the covering member. The light emitting device may use a bump as the conductive member. Examples of the material of the bump include Au and an alloy thereof, and examples of the other conductive member include eutectic solder (Au—Sn), Pb—Sn, and lead-free solder.

The following describes an example of the method for producing a light emitting device. For the details, for example, the disclosure of Japanese Unexamined Patent Publication No. 2014-112635 or Japanese Unexamined Patent Publication No. 2017-117912 may be referred to. The method for producing a light emitting device preferably includes a step of disposing a light emitting element, optionally a step of disposing a semiconductor element, a step of preparing a wavelength conversion member, a step of bonding a light emitting element and a wavelength conversion member, and a step of disposing a covering member.

For example, in the step of disposing a light emitting element, a light emitting element is disposed on a substrate. The light emitting element and a semiconductor element are flip-chip mounted, for example, on the substrate. In the step of preparing a wavelength conversion member, a wavelength conversion member composed of a ceramic sintered body obtained by the above production method is prepared. Next, in the step of bonding a light emitting element and a wavelength conversion member, the prepared wavelength conversion member is opposed to the light emitting surface of the light emitting element, and the wavelength conversion member is bonded to the light emitting element by an adhesive layer. Next, in the step of disposing a covering member, the side surfaces of the light emitting element and the wavelength conversion member are covered with a covering member. The covering member is for reflecting light emitted from the light emitting element, and when the light emitting device also includes a semiconductor element, the covering member is preferably disposed so as to embed the semiconductor element. Thus, the light emitting device shown in FIGS. 4A and 4B can be produced.

EXAMPLES

The present disclosure is hereunder specifically described with reference to the following Examples. The present disclosure is not limited to the following Examples.

Example 1

Preparing Nitride Fluorescent Material

Ba and Sr were used as the alkaline earth metal element $M^1$ contained in the nitride fluorescent material, and Eu was used as the metal element $M^2$. $Ba_3N_2$, $Sr_3N_2$, EuN, and SigNa were used as raw materials. Each compound as a raw material was weighed so as to have a molar ratio of Ba:Sr:Eu:Si=1.120:0.873:0.007:5 in terms of charge amount in a glove box with an inert gas atmosphere, and then mixed to obtain a raw material mixture. The resulting raw material mixture was filled into a crucible, and subjected to heat treatment at a gas pressure of 0.9 MPa in terms of gauge pressure and a temperature of 1,600° C. for 5 hours in an atmosphere containing 99.9% by volume or more of nitrogen and the balance of oxygen (0.1% by volume or less) to obtain a calcined product. The resulting calcined product was dispersed because the particles were sintered together, and then subjected to sieve classification to remove coarse and fine particles to obtain a nitride fluorescent material having a composition of $(Ba_{0.56}Sr_{0.1365}Eu_{0.0035})_2Si_5N_8$. The average particle diameter (Fisher Sub-Sieve Sizer's number) of the resulting nitride fluorescent material was measured by the FSSS method using a Fisher Sub-Sieve Sizer Model 95 (manufactured by Fisher Scientific Inc.). The average particle diameter of the nitride fluorescent material measured by the FSSS method was 1.0 μm.

Preparing Molded Body

The resulting nitride fluorescent material was filled into a mold, and press-molded at a pressure of 2 MPa to form a cylindrical molded body having a diameter of 28.5 mm and a thickness of 10 mm. The molded body was further subjected to CIP molding at a pressure of 352.8 MPa to form a cylindrical molded body having a diameter of 25 mm and a thickness of 9 mm. The resulting molded body was composed only of the above-mentioned nitride fluorescent material, which was 100% by mass of the nitride fluorescent material.

Obtaining First Sintered Body

The resulting molded body was placed in a calcining furnace (manufactured by Fujidempa Kogyo Co., Ltd.) and primarily calcined at 1,675° C. and 0.9 MPa with a holding time of 1 hour in an atmosphere containing 99.9% by volume or more of nitrogen and the balance of oxygen (0.1% by volume or less) to obtain a first sintered body. The first sintered body was further processed by slicing the first sintered body to a thickness of 720 μm using a wire saw.

Obtaining Second Sintered Body

A crucible made of a molybdenum metal and two plate-shaped bodies each made of a molybdenum metal (molybdenum purity of 99.9% by mass) having a length of 30 mm, a width of 30 mm, and a thickness of 0.2 mm were prepared. The principal surface of each of the two plate-shaped bodies made of a molybdenum metal was brought into contact with each of the two circular principal surfaces of the resulting first sintered body having a diameter of 25 mm, and the first sintered body sandwiched between the two plate-shaped bodies made of a molybdenum metal was placed in the crucible. The crucible containing the first sintered body sandwiched between the two plate-shaped bodies made of a molybdenum metal was placed in a calcining furnace (manufactured by Fujidempa Kogyo Co., Ltd.) and secondly calcined at 1,675° C. and 0.9 MPa with a holding time of 2 hours in an atmosphere containing 99.9% by volume or more of nitrogen and the balance of oxygen (0.1% by volume or less) to obtain a second sintered body.

Obtaining Third Sintered Body

A crucible containing a tungsten metal (tungsten content of 99.9% by mass) having a melting point higher than that of the molybdenum metal was prepared. The plate-shaped bodies made of a molybdenum metal were removed from the second sintered body, the resulting second sintered body was placed in the crucible containing a tungsten metal in no contact with the plate-shaped bodies made of a molybdenum metal, and the crucible was placed in a calcining furnace (manufactured by Fujidempa Kogyo Co., Ltd.) and thirdly calcined at 1,750° C. and 0.9 MPa with a holding time of 1 hour in an atmosphere containing 99.9% by volume or more of nitrogen and the balance of oxygen (0.1% by volume or less) to obtain a third sintered body. The resulting third sintered body was processed by grinding both principal surfaces of the third sintered body using a surface grinder so as to have a thicknesses shown in Table 1, thereby obtaining a ceramic sintered body according to Example 1. The thickness of each ceramic sintered body according to Examples and Comparative Examples is listed in Table 1.

Example 2

A ceramic sintered body according to Example 2 was obtained in the same or similar manner as in Example 1, except that in obtaining a second sintered body, the secondary calcination was performed at a temperature shown in Table 1.

Examples 3 and 4

Ceramic sintered bodies according to Examples 3 and 4 were obtained in the same or similar manner as in Example 1, except that in preparing a nitride fluorescent material, a nitride fluorescent material having a composition of $(Ba_{0.56}Sr_{0.4375}Eu_{0.0025})_2Si_5N_8$ was obtained, and in obtaining a second sintered body, the secondary calcination was performed at each temperature shown in Table 1.

Examples 5 to 7

Ceramic sintered bodies according to Examples 5 to 7 were obtained in the same or similar manner as in Example 1, except that in preparing a nitride fluorescent material, a nitride fluorescent material having a composition of $(Ba_{0.56}Sr_{0.4385}Eu_{0.0015})_2Si_5N_8$ was obtained, and in obtaining a second sintered body, the secondary calcination was performed at each temperature shown in Table 1.

Examples 8 and 9

Ceramic sintered bodies according to Examples 8 and 9 were obtained in the same or similar manner as in Example 1, except that in obtaining a third sintered body, the third calcination was performed at each temperature shown in Table 1.

Comparative Example 1

A ceramic sintered body according to Comparative Example 1 was obtained in the same or similar manner as in Example 1, except that in obtaining a second sintered body, the first sintered body was placed in a crucible containing a tungsten metal without contacting the plate-shaped body composed of a molybdenum metal, and secondary calcined.

Comparative Examples 2 and 3

Ceramic sintered bodies according to Comparative Examples 2 and 3 were obtained in the same or similar manner as in Comparative Example 1, except that in obtaining a second sintered body, the secondary calcination was performed at each temperature shown in Table 1.

Comparative Example 4

A ceramic sintered body according to Comparative Example 4 was obtained in the same or similar manner as in Example 1, except that the third calcination was not performed. In Table 1, the symbol "-" indicates that the third calcination has not been performed.

Comparative Example 5

A ceramic sintered body according to Comparative Example 5 was obtained in the same or similar manner as in Example 2, except that the third calcination was not performed.

The ceramic sintered bodies according to Examples and Comparative Examples were subjected to the following measurements. The results are shown in Table 1.

Relative Density (%)

The relative density of the ceramic sintered body according to each of Examples and Comparative Examples was calculated by the above calculation formulas (1) and (2). The true density of the ceramic sintered body was the true density of the nitride fluorescent material that formed the molded body of each of Examples and Comparative Examples, and the true density of the nitride fluorescent material was 4.33 g/cm$^3$.

Chromaticity Coordinates (x, y)

The ceramic sintered body according to each of Examples and Comparative Examples was mounted on a light emitting element (LED) having a light emission peak wavelength of 455 nm to produce a light emitting device sample. In each light emitting device sample, the ceramic sintered body was irradiated with excitation light by applying a current of 1 A to the light emitting element, and the chromaticity coordinates (x, y) of the fluorescence emitted from the ceramic sintered body in the CIE 1931 color system were measured using a multichannel spectrometer (product name: PMA-12, manufactured by Hamamatsu Photonics K.K.)

Relative Luminous Flux (%)

In each light emitting device sample using the ceramic sintered body according to each of Examples and Comparative Examples, the ceramic sintered body was irradiated with excitation light by applying a current of 1 A to the light emitting element, and the luminous flux (lm) of the fluorescence emitted from the ceramic sintered body was measured using a total luminous flux measuring apparatus. The luminous flux of fluorescence emitted from each ceramic sintered body was calculated as a relative luminous flux (%), assuming that the luminous flux in Comparative Example 3, which had the lowest secondary calcination temperature, was 100%.

TABLE 1

| | Secondary calcining | | Third calcining | | Ceramic sintered body | | | | |
|---|---|---|---|---|---|---|---|---|---|
| | Metal or alloy | Temperature (° C.) | Metal or alloy | Temperature (° C.) | Relative density (%) | Thickness (μm) | Chromaticity coordinates x | Chromaticity coordinates y | Relative luminous flux (%) |
| Example 1 | molybdenum | 1675 | tungsten | 1750 | 97.7 | 102 | 0.563 | 0.422 | 124.4 |
| Example 2 | molybdenum | 1700 | tungsten | 1750 | 98.4 | 100 | 0.565 | 0.423 | 122.7 |
| Example 3 | molybdenum | 1675 | tungsten | 1750 | 97.2 | 138 | 0.563 | 0.430 | 118.0 |
| Example 4 | molybdenum | 1700 | tungsten | 1750 | 99.4 | 136 | 0.567 | 0.429 | 115.7 |
| Example 5 | molybdenum | 1675 | tungsten | 1750 | 98.6 | 161 | 0.550 | 0.435 | 108.2 |
| Example 6 | molybdenum | 1700 | tungsten | 1750 | 99.9 | 162 | 0.546 | 0.430 | 117.9 |
| Example 7 | molybdenum | 1650 | tungsten | 1750 | 98.3 | 162 | 0.540 | 0.425 | 116.3 |
| Example 8 | molybdenum | 1675 | tungsten | 1700 | 95.8 | 103 | 0.559 | 0.421 | 122.7 |
| Example 9 | molybdenum | 1675 | tungsten | 1800 | 97.0 | 99 | 0.560 | 0.419 | 122.3 |
| Comparative Example 1 | tungsten | 1675 | tungsten | 1750 | 94.6 | 100 | 0.574 | 0.420 | 104.4 |
| Comparative Example 2 | tungsten | 1700 | tungsten | 1750 | 93.5 | 100 | 0.574 | 0.420 | 102.7 |
| Comparative Example 3 | tungsten | 1650 | tungsten | 1750 | 93.5 | 99 | 0.576 | 0.421 | 100.0 |
| Comparative Example 4 | molybdenum | 1675 | — | — | 96.7 | 99 | 0.534 | 0.400 | 20.7 |
| Comparative Example 5 | molybdenum | 1700 | — | — | 99.1 | 100 | 0.470 | 0.230 | 0.0 |

The ceramic sintered bodies according to Examples 1 to 9 each had a high relative density of 95% or more and a had relative luminous flux higher than that of the ceramic sintered bodies according to Comparative Examples 1 to 5. The ceramic sintered bodies according to Examples 1 to 9 each emitted fluorescence with orange luminescence upon irradiation with the light emitted from the light emitting element. The results show that in each of the ceramic sintered bodies according to Examples 1 to 9, the principal surface of the first sintered body was sandwiched between two molybdenum metals and brought into contact with each other for secondary calcination, so that impurities contained in the first sintered body were decomposed and released as gas, and then the resulting body was placed in a crucible containing tungsten and third calcined at a temperature higher than that of the secondary calcination, resulting in a ceramic sintered body composed of a third sintered body having a high relative density and a desired body color, and emitting fluorescence with a desired luminescent color.

The ceramic sintered bodies according to Examples 1 to 4, 8, and 9 each emitted fluorescence with a luminescent color within the area A in the xy chromaticity coordinates of the CIE 1931 chromaticity diagram.

The ceramic sintered bodies according to Examples 1 to 7 and 9 each had a relative density of 97% or more, a higher relative density, no darkening or dulling on the surface, and a desired body color. The ceramic sintered body according to Example 8 had a relative density of 95% or more, because the difference between the temperature of the secondary calcination and the temperature of the third calcination was 25° C., which was small, and thus the amount of the decomposed impurities released as a gas during the third calcination was considered to be small. The ceramic sintered body according to Example 8 had a desired body color and a high relative luminous flux.

The ceramic sintered bodies according to Examples 5 to 7 each emitted fluorescence with a desired color, although the composition of the nitride fluorescent material was different from that of the ceramic sintered bodies according to Examples 1 to 4, 8, and 9, and the luminescence color was not within the area A.

Figure 5A:
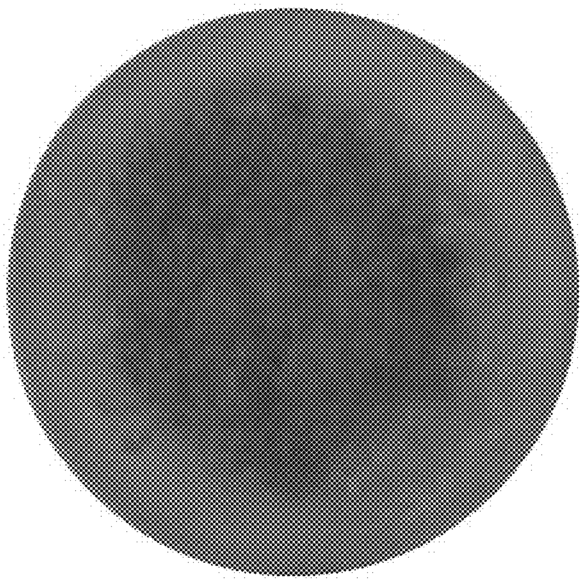
FIG. 5A is a photograph showing an appearance of a second sintered body after secondary calcination according to Example 3.
Figure 5B:
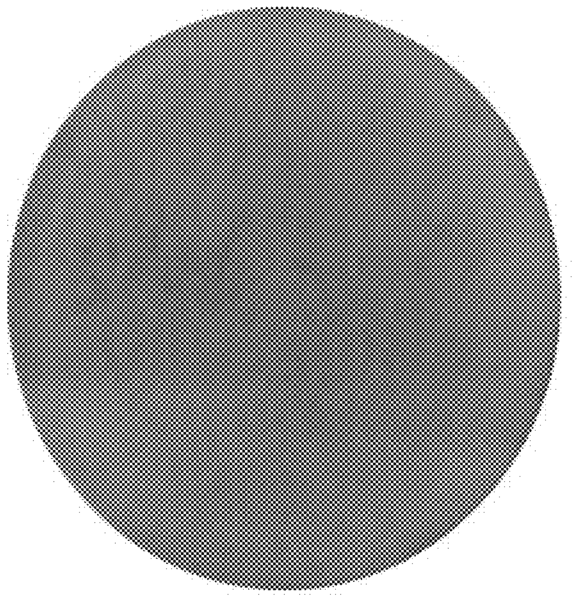
FIG. 5B is a photograph showing an appearance of a third sintered body after third calcination according to Example 3.

FIG. 5A is a photograph showing the appearance of the principal surface of the second sintered body after secondary calcination in Example 3, and FIG. 5B is a photograph showing the appearance of the principal surface of the third sintered body after third calcination in Example 3. As shown in FIG. 5A, the principal surface of the second sintered body after secondary calcination in Example 3 was blackened and dulled, because part of the gas released by the decomposition of impurities such as crystals having a composition different from that of the nitride fluorescent material contained inside the first sintered body, or a reaction product formed by the reaction of the gas with the molybdenum metal, remained on the surface of the second sintered body. As shown in FIG. 5B, the principal surface of the third sintered body after third calcination in Example 3 was not blackened and dulled in body color, because the second sintered body was thirdly calcined while being placed in a container containing a metal having a melting point higher than that of the molybdenum metal, and the blackening and dullness remaining on the surface of the second sintered body were decomposed and released as a gas into the atmosphere, thereby obtaining a third sintered body having a desired body color.

The ceramic sintered bodies according to Comparative Examples 1 to 3 each had a relative density lower than that of the ceramic sintered bodies according to Examples 1 to 9, because the secondary calcination was performed by placing the first sintered body in a crucible containing tungsten without bringing the first sintered body into contact with a solid composed of a molybdenum metal or an alloy containing molybdenum as a main component during the secondary calcination, and thus the amount of the gas released by the decomposition of impurities contained in the first sintered body was small. The ceramic sintered bodies according to Comparative Examples 1 to 3 each had a relative density lower than that of the ceramic sintered bodies according to Examples 1 to 9, and also had a relative luminous flux lower than that of the ceramic sintered bodies according to Examples 1 to 9.

The ceramic sintered bodies according to Comparative Examples 4 and 5 each had at least part of the body color turned black and a very low relative luminous flux of 20.7% or 0%, because the secondary calcination was performed by bringing the first sintered body into contact with a solid composed of a molybdenum metal or an alloy containing molybdenum as a main component during the secondary calcination, but the third calcination was not performed, and the blackening and dullness formed by the gas released by the decomposition of impurities contained in the first sintered body during the secondary calcination were not removed.

Figure 6A:
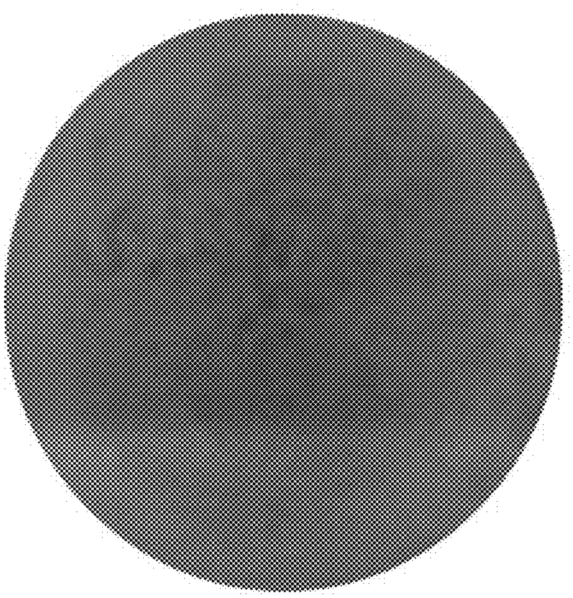
FIG. 6A is a photograph showing an appearance of a second sintered body after secondary calcination according to Comparative Example 4.
Figure 6B:
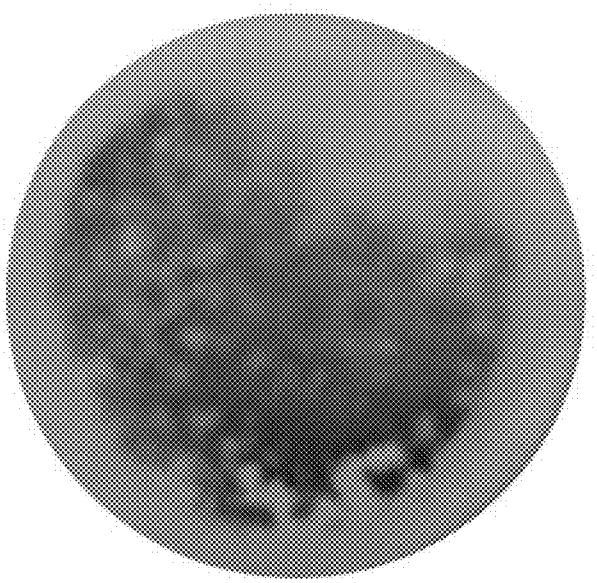
FIG. 6B is a photograph showing an appearance of a second sintered body after grinding according to Comparative Example 4.

FIG. 6A is a photograph showing the appearance of the principal surface of the second sintered body after secondary calcination in Comparative Example 4, and FIG. 6B is a photograph showing the appearance of the principal surface of the second sintered body after grinding without third calcination in Comparative Example 4. As shown in FIG. 6A, the principal surface of the second sintered body after secondary calcination in Comparative Example 4 was dulled, because part of the gas released by the decomposition of impurities such as crystals having a composition different from that of the nitride fluorescent material contained inside the first sintered body, or a reaction product formed by the reaction of the gas with the molybdenum metal, remained on the surface and inside of the second sintered body. As shown in FIG. 6B, the ceramic sintered body in Comparative Example 4 was blackened, because the third calcination was not performed, and the dullness remained on the surface and inside of the second sintered body even when the second sintered body was ground, resulting in a low relative luminous flux.

The ceramic sintered body obtained by the production method according to the present disclosure can be used as a wavelength conversion member that can convert the wavelength of light emitted from an LED or LD in light emitting devices for applications such as on-vehicle lighting, general lighting, backlights for liquid crystal display devices, illuminations, and light sources for projectors. The ceramic sintered body obtained by the production method according to the present disclosure emits light upon irradiation with excitation light and can be used as a material for solid scintillators.

What is claimed is:

1. A method for producing a ceramic sintered body comprising:

providing a molded body containing a nitride fluorescent material wherein the nitride fluorescent material comprises: Si; N; an alkaline earth metal element $M^1$ being at least one selected from the group consisting of Ba, Sr, Ca, and Mg; and a metal element $M^2$ being at least one selected from the group consisting of Eu, Ce, Tb, and Mn, to obtain a composition in which, relative to 1 mol of the composition, a total molar ratio of the alkaline earth metal element $M^1$ and the metal element $M^2$ is 2, a molar ratio of the metal element $M^2$ is a product of a parameter y and 2, the parameter y being 0.001 or more and less than 0.5, a molar ratio of Si is 5, and a molar ratio of N is 8;

obtaining a first sintered body by performing primary calcination of the molded body;

obtaining a second sintered body by performing secondary calcination of the first sintered body in contact with a solid composed of a molybdenum metal or an alloy containing molybdenum as a main component; and obtaining a third sintered body by performing third calcination of the second sintered body while being placed in a container containing a metal having a melting point higher than a melting point of the molybdenum metal.

2. The method for producing a ceramic sintered body according to claim 1, wherein in obtaining the second sintered body, a temperature of the secondary calcination is 1,650° C. or higher and 1,800° C. or lower;

in obtaining the third sintered body, a temperature of the third calcination is 1,650° C. or higher and 1,850° C. or lower and is higher than the temperature of the secondary calcination; and the secondary calcination and the third calcination are performed at a gauge pressure that is 0.2 MPa or more and 2.0 MPa or less in an atmosphere containing nitrogen.

3. The method for producing a ceramic sintered body according to claim 1, wherein, in obtaining the second sintered body, the first sintered body comprises a plate-shaped body, and a thickness of the first sintered body is 200 μm or more and 1,500 μm or less.

4. The method for producing a ceramic sintered body according to claim 3, wherein, in obtaining the second sintered body, the solid composed of the molybdenum metal or the alloy containing molybdenum as the main component is brought into contact with a principal surface of the first sintered body.

5. The method for producing a ceramic sintered body according to claim 1, wherein, in obtaining the second sintered body, the solid composed of the molybdenum metal or the alloy containing molybdenum as the main component comprises a plate-shaped body.

6. The method for producing a ceramic sintered body according to claim 1, wherein, in obtaining the second sintered body, the first sintered body comprises a plate-shaped body, and the first sintered body is sandwiched between two solids composed of the molybdenum metal or the alloy containing molybdenum as the main component and brought into contact with each other.

7. The method for producing a ceramic sintered body according to claim 1, wherein, in obtaining the second sintered body, the secondary calcination is performed for 1 hour or more and 3 hours or less.

8. The method for producing a ceramic sintered body according to claim 1, wherein, in obtaining the third sintered body, the third calcination is performed for 1 hour or more and 5 hours or less.

9. The method for producing a ceramic sintered body according to claim 1, wherein a relative density of the third sintered body is 97% or more.

10. The method for producing a ceramic sintered body according to claim 1, wherein, in obtaining the third sintered body, the metal having the melting point higher than the melting point of the molybdenum metal comprises at least one selected from the group consisting of tungsten, tantalum, and rhenium.

11. The method for producing a ceramic sintered body according to claim 1, wherein the nitride fluorescent material has a composition represented by the following formula (I):

$$(M^1_{1-y}M^2_y)_2Si_5N_8, \quad (I)$$

wherein $M^1$ represents at least one alkaline earth metal element selected from the group consisting of Ba, Sr, Ca, and Mg; $M^2$ represents at least one metal element selected from the group consisting of Eu, Ce, Tb, and Mn; and y satisfies $0.001 \leq y < 0.5$.

* * * * *